(12) United States Patent
Hedrick et al.

(10) Patent No.: US 6,467,738 B1
(45) Date of Patent: Oct. 22, 2002

(54) TRIPOD-STRUCTURE FOR TELESCOPES

(75) Inventors: Richard L. Hedrick, San Pedro; Manishi Gupta, Los Alamitos; Jospeh R. Garrison, Garden Grove, all of CA (US)

(73) Assignee: Celestron International, Torrance, CA (US)

( * ) Notice: Subject to any disclaimer, the term of this patent is extended or adjusted under 35 U.S.C. 154(b) by 0 days.

(21) Appl. No.: 09/640,743

(22) Filed: Aug. 18, 2000

(51) Int. Cl.⁷ ............................................. F16M 11/20
(52) U.S. Cl. ................ 248/164; 248/188.7; 248/188.6; 248/177.1; 359/430
(58) Field of Search .............................. 248/164, 188.7, 248/177.1, 188.6, 165, 460, 463; 359/430, 399

(56) References Cited

U.S. PATENT DOCUMENTS

| | | | | |
|---|---|---|---|---|
| 836,771 A | * | 11/1906 | Lohmann | 359/430 |
| 2,571,287 A | * | 10/1951 | Peters | 33/73 |
| 2,711,589 A | * | 6/1955 | Stock | 359/430 |
| 2,908,459 A | * | 10/1959 | Howorth | 359/399 |
| 4,129,287 A | * | 12/1978 | Bressler | 248/165 |
| 4,222,646 A | * | 9/1980 | West | 354/79 |
| 4,317,552 A | * | 3/1982 | Weidler | 248/168 |
| 4,455,005 A | * | 6/1984 | Mooney | 248/188.8 |
| 4,640,482 A | * | 2/1987 | Rogers | 248/168 |
| 4,691,444 A | * | 9/1987 | Capps | 33/290 |
| 4,832,296 A | * | 5/1989 | Schnepp | 248/168 |
| 4,948,086 A | * | 8/1990 | Buol et al. | 248/676 |
| 5,404,280 A | * | 4/1995 | Greek et al. | 362/198 |
| 5,949,548 A | * | 9/1999 | Shirai et al. | 356/375 |

* cited by examiner

Primary Examiner—Kimberly T. Wood
(74) Attorney, Agent, or Firm—Patton Boggs LLP

(57) ABSTRACT

A tripod/telescope assembly including a tripod structure and optical tube-fork-base structure removably connected to one another by a conical central opening formed in an upper structure of the tripod and a complementary conical structure extending from a lower portion of the optical tube-fork-base. The tripod has three equally spaced legs pivotally extending downward from the upper structure of the tripod head. The tripod structure and optical tube-fork-base structure are disassembled and reassembled by a hand knob that has a central threaded fastening shaft extending through the complementary conical structures. The hand knob and complementary conical structures establish a stable, rotatable platform and allow the tube-fork-base structure of the telescope to be quickly separable from the tripod structure for transportation purposes.

7 Claims, 5 Drawing Sheets

TRIPOD-STRUCTURE FOR TELESCOPES

BACKGROUND OF THE INVENTION

This invention relates to tripods. More particularly, this invention relates to tripods used for supporting telescopes having a base.

Tripods for use in holding telescopes and other structures are known in the art. Reference is made, e.g., to U.S. Pat. Nos. 5,614,918; 4,470,672; 5,865,406; 4,317,552; 4,455,005; 4,832,296; and 5,760,748.

A drawback associated with conventional tripods is the necessity to build the tripod into the base of the telescope (or other structure), wherein the tops of the three legs are connected to the base at 120° intervals, requiring a separate fastener at each of the intervals. Such tripod/telescope assemblies can be cumbersome and difficult to carry.

Alternatively, the tripod/telescope structure could be disassembled at an original site, separately carried to a new site, and then reassembled. However, this approach can be time-consuming because three fasteners would have to be unscrewed to remove the telescope base from the tripod and then re-screwed at the new site.

Another approach that might be used with telescopes containing a fork in addition to the base and the optical tube is to separate the fork/tube structure from the tripod/base structure and separately carried these components to a new site. However, this approach would not be acceptable for some newer models of telescopes which contain the controls in the fork member. With such telescopes, it is undesirable to remove the base from the fork.

Accordingly, a primary object of this invention is to provide a tripod/telescope assembly which is easier to move from one site to another site.

A further object of this invention is to provide a tripod/telescope assembly which is easier to disassemble and then re-assemble.

A still further object of this invention is to provide a tripod/telescope assembly wherein the tube/fork/base structure is completely separable from the tripod structure.

Another object of this invention is to provide an improved tripod structure which can be combined with a telescope to form a tripod/telescope assembly satisfiing the foregoing objects. These and other objects are accomplished in the present invention.

SUMMARY OF THE INVENTION

According to one aspect thereof, the present invention provides a tripod/telescope assembly wherein the tripod structure and the tube/fork/base structure are completely separable from one another and, further, are relatively simple to disassemble and re-assemble. The tripod/telescope of this invention includes:

(A) a telescope having a base, a fork mounted on the base (wherein the fork most preferably contains the telescope's controls), and an optical tube mounted on the fork;

(B) a tripod containing:
  a tripod head having a central opening formed therein,
  three legs pivotally mounted on the tripod head, and
  a hand knob attached to the tripod head and disposed within the central opening, the hand knob having a single fastener therein, the single fastener being releasably attached to the base of the telescope, thereby connecting the tripod to the telescope to form the tripod/telescope assembly.

A second aspect of this invention is directed to a tripod containing:
  a tripod head having a central opening formed therein,
  three legs pivotally mounted on the tripod head,
  a hand knob attached to the tripod head and disposed within the central opening, the hand knob having a single fastener therein, the single fastener being adapted for attachment to the base of the telescope; and, optionally,
  a brace member which is attached to each of the legs so as to provide additional stability to the tripod.

In the present invention, having the tripod built into the hand knob allows the base-fork-tube structure of the telescope to be completely separable from the tripod. In addition, having the hand knob contain a single fasteners makes it simpler and faster to disassemble the tripod/telescope assembly, carry the tripod and telescope separately to a new site, and then re-assemble the tripod/telescope assembly.

DETAILED DESCRIPTION OF THE INVENTION

Figure 1:
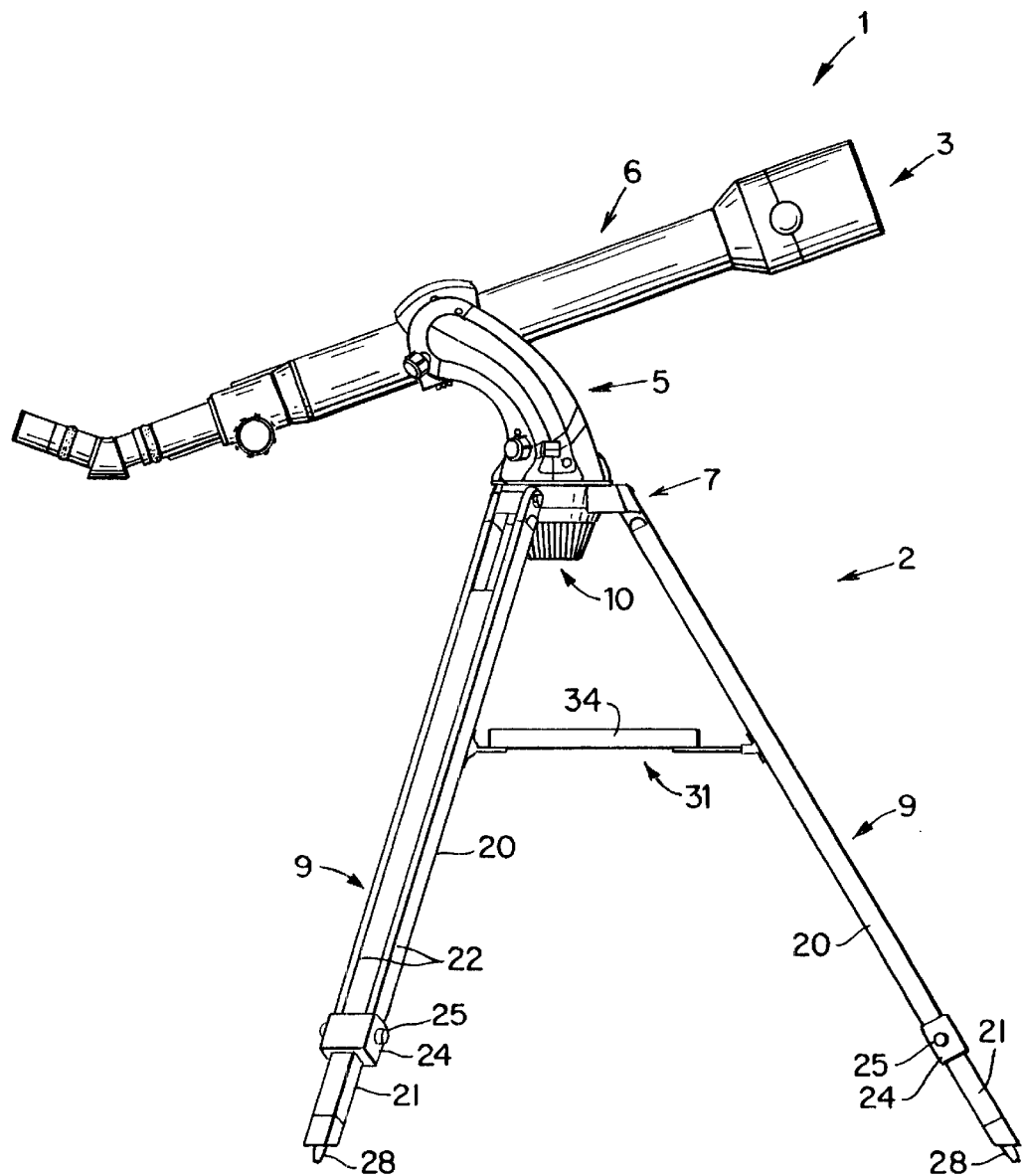
FIG. 1 is a perspective view of a tripod/telescope assembly within the scope of this invention, wherein the tripod of this invention is shown supporting a telescope.

The present invention will be described with reference to FIGS. 1–5 herein.

In the attached Figures, a tripod/telescope assembly within the scope of this invention is referenced generally by numeral 1 and the tripod of this invention is designated by numeral 2. The telescope used in tripod/telescope assembly 1 is represented by numeral 3. Telescope 3 includes a base 4, a fork 5 and an optical tube 6.

As shown in FIGS. 1–5, tripod 2 is composed of a tripod head 7 having a central opening 8 formed therein, three legs 9 pivotally mounted on the tripod head 7, and a hand knob 10 attached to the tripod head and disposed within the central opening, the hand knob having a fastener 11 therein which is adapted for attachment to the base 4 of the telescope 3.

Tripod head 7 has an annular, hollow body 12 with central opening 8 formed therein and an annular flange 13 which rims the open top of the central opening. By means of fasteners 14 extending through through-holes formed in flange 13 and fasteners (not shown) extending through holes formed in the body 12 of tripod head 7, three arcuate hinge brackets 15 are attached to tripod head 7. As will be discussed later herein, brackets 15 are used to attach legs 9 to the tripod head.

Hand knob 10 has a hollow interior 16 and is dimensioned so as to fit within the central opening 8 of tripod head 7.

Preferably, knurls 17 are formed on an outer side wall 18 of hand knob 10 to facilitate handling of the hand knob. Fastener means 11, preferably in the form of a threaded shaft, is connected to the interior 16 of the hand knob, e.g., by means of a reinforcing web 19. When hand knob 10 is positioned in central opening 8 of the tripod head, fastener means 11 emends through the central opening 8. As will be discussed later herein, in the tripod/telescope assembly 1, base 4 of telescope 3 is seated within central opening 8 and hand knob 10, and fastener means 11 is attached to a corresponding fastener means (not shown) disposed on the underside of base 4, thereby attaching tripod 2 to telescope 3.

Each tripod leg 9 has a fixed leg member 20 and a sliding leg member 21. The fixed leg member 20 has a pair of track members 22 which are interconnected at the top by means of an arcuate bracket 15 fitted with a pin 23, and at the bottom by means of a clamp 24 equipped with a pin 25, so that the track members will be maintained in a parallel relationship.

The sliding leg member 21 slides within a defined rectangular opening 26 of the fixed leg member 20. Accordingly, the two leg members may be adjusted axially with respect to one another in an essentially telescopic fashion so as to permit adjustment of the overall length of the leg. A support bracket 27 is preferably provided on each sliding leg member 21 to aid in adjusting the overall length of the three legs 9 as desired.

Each of the sliding leg members 21 preferably terminates at a foot 28.

Legs 9 are independently pivotally secured to the tripod head 7 in a suitable manner. Each leg is arcuately movable from a closed position (not shown), in which the legs are clustered around the tripod axis, to an extended position in which they extend at an angle from the axis.

The tripod head 7 has three spaced apart arcuate brackets 15 extending laterally from the tripod head at equally spaced (120°) angular intervals around the axis of the tripod.

The legs are pivotally mounted on the tripod head by means of pivot pins 23 which extend through aligned holes (not shown) in the arcuate brackets 15 and the upper ends 29 and 30 of sides 20a and 20b of the fixed leg member. Each pin 23 has a threaded end (not shown) and one of the arcuate brackets 15 and one of the fixed leg member upper ends 29 or 30 are also provided with a threaded hole (not shown) to secure the pin 23 after assembly of the parts.

Figure 4:
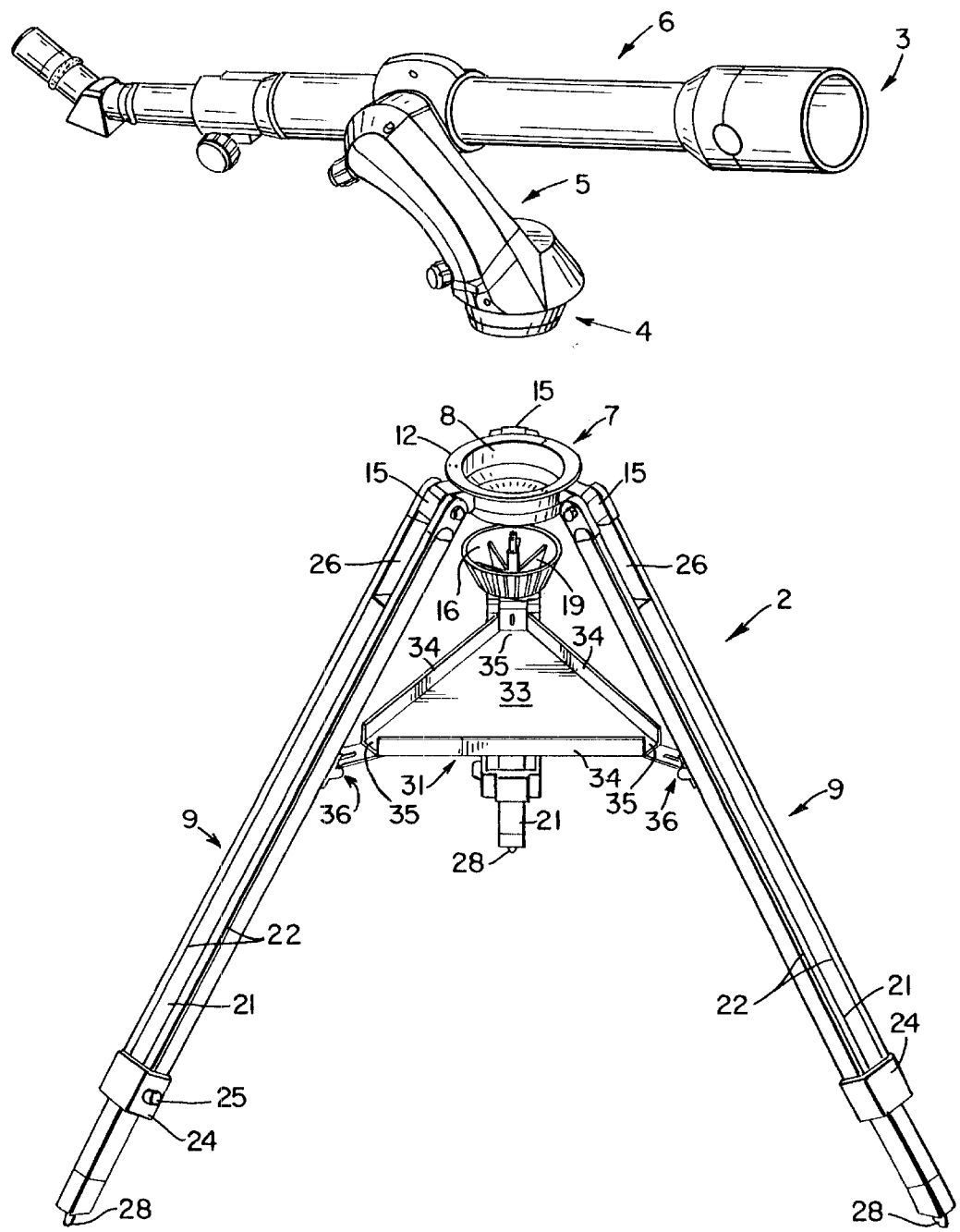
FIG. 4 is a side elevational view of the tripod/telescope assembly illustrated in FIG. 1.
Figure 5:
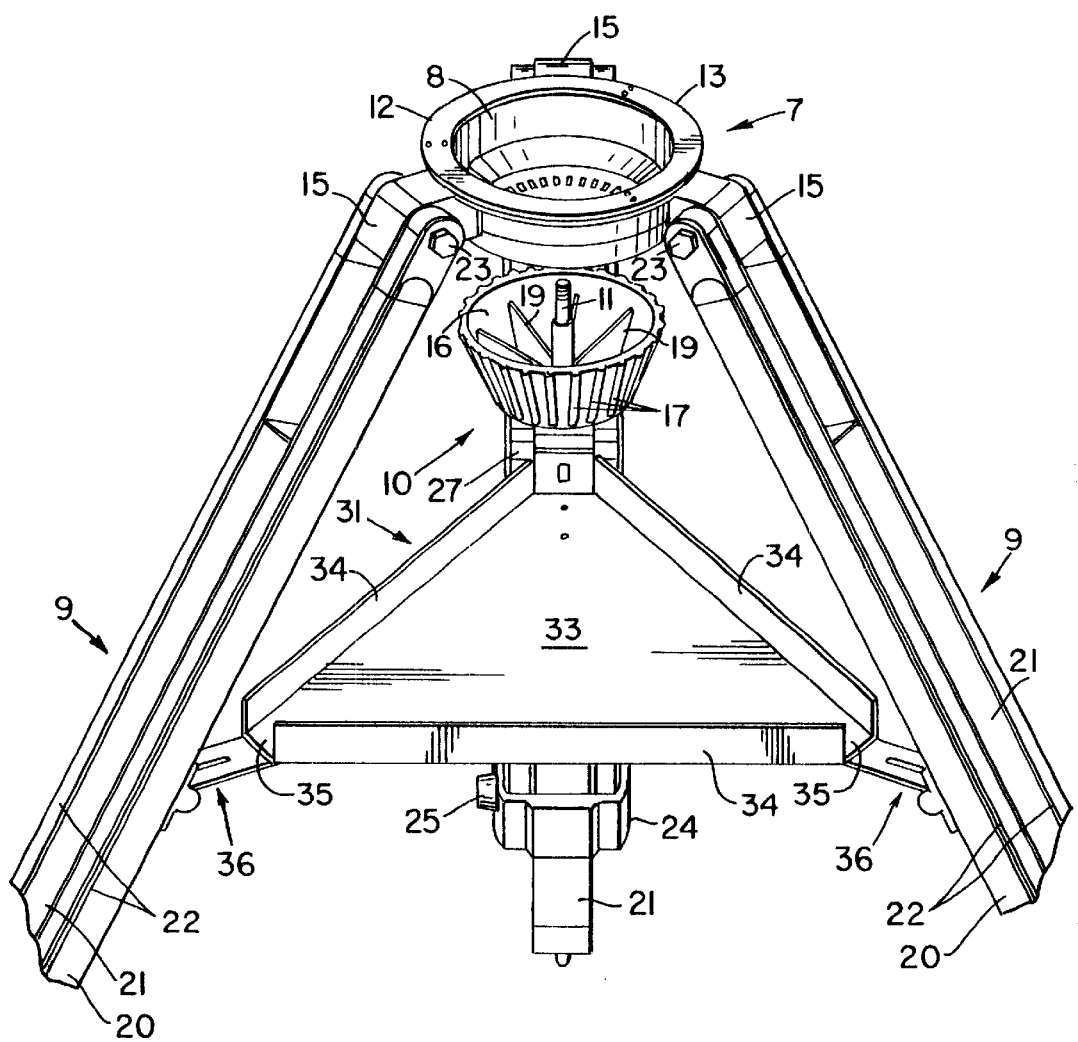
FIG. 5 is a detailed side elevational view of the tripod used in the assembly illustrated in FIG. 4.

The tripod of this invention preferably also includes a brace 31, which increases the stability of the tripod structure. In particularly preferred embodiments, brace 31 includes an accessory tray 32 as shown in FIGS. 4 and 5. The brace has a generally triangular body defined by a flat surface 33, three flanged sides 34 generally rimming the flat surface, and three comers 35, with one comer being disposed between each adjacent pair of flanged sides 34. The brace 31 nay be attached to the legs 9 by means of a slotted bracket/clamp assembly 36 disposed at each comer 35.

Figure 2:
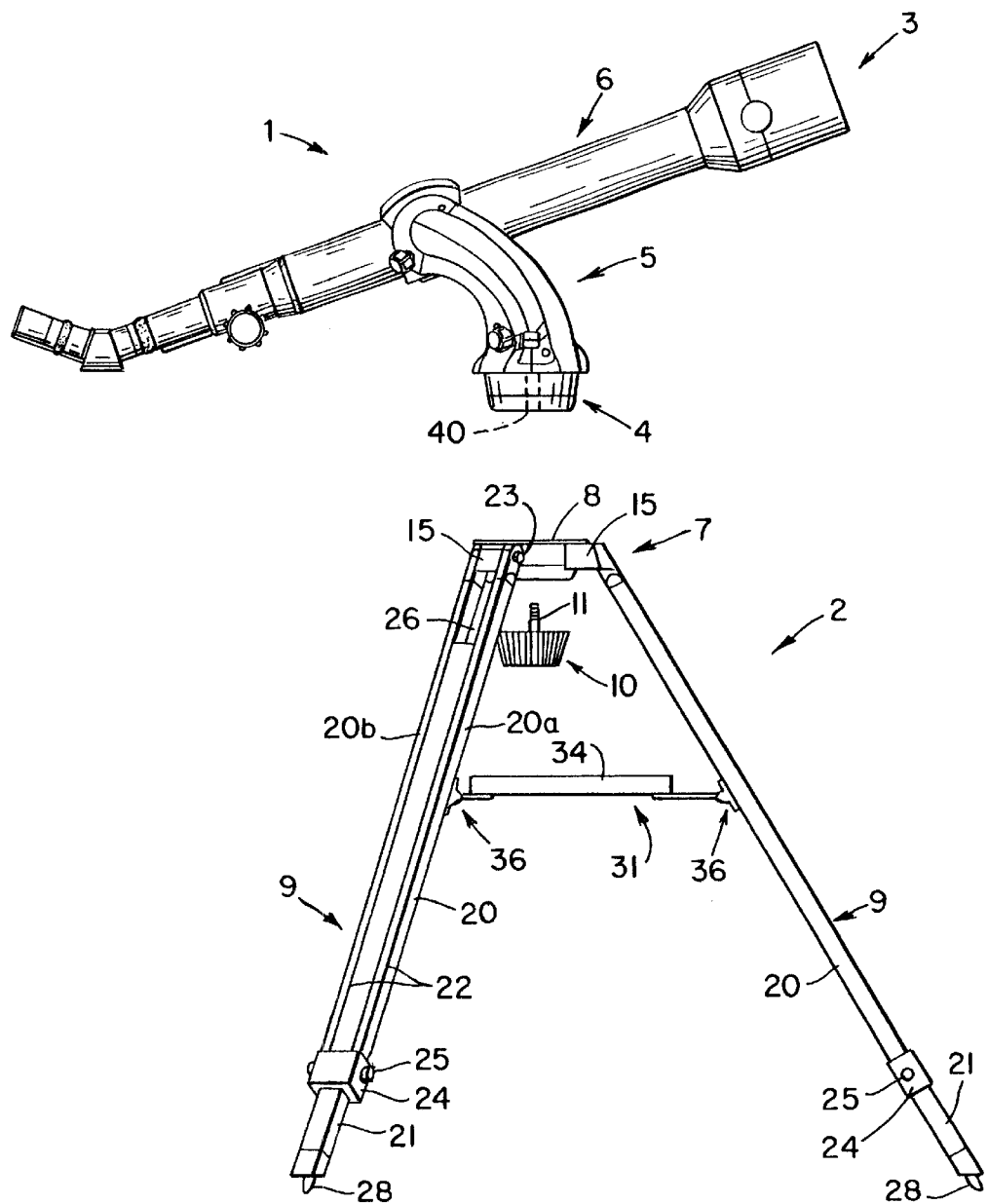
FIG. 2 is an exploded view of the tripod/telescope assembly shown in FIG. 1.
Figure 3:
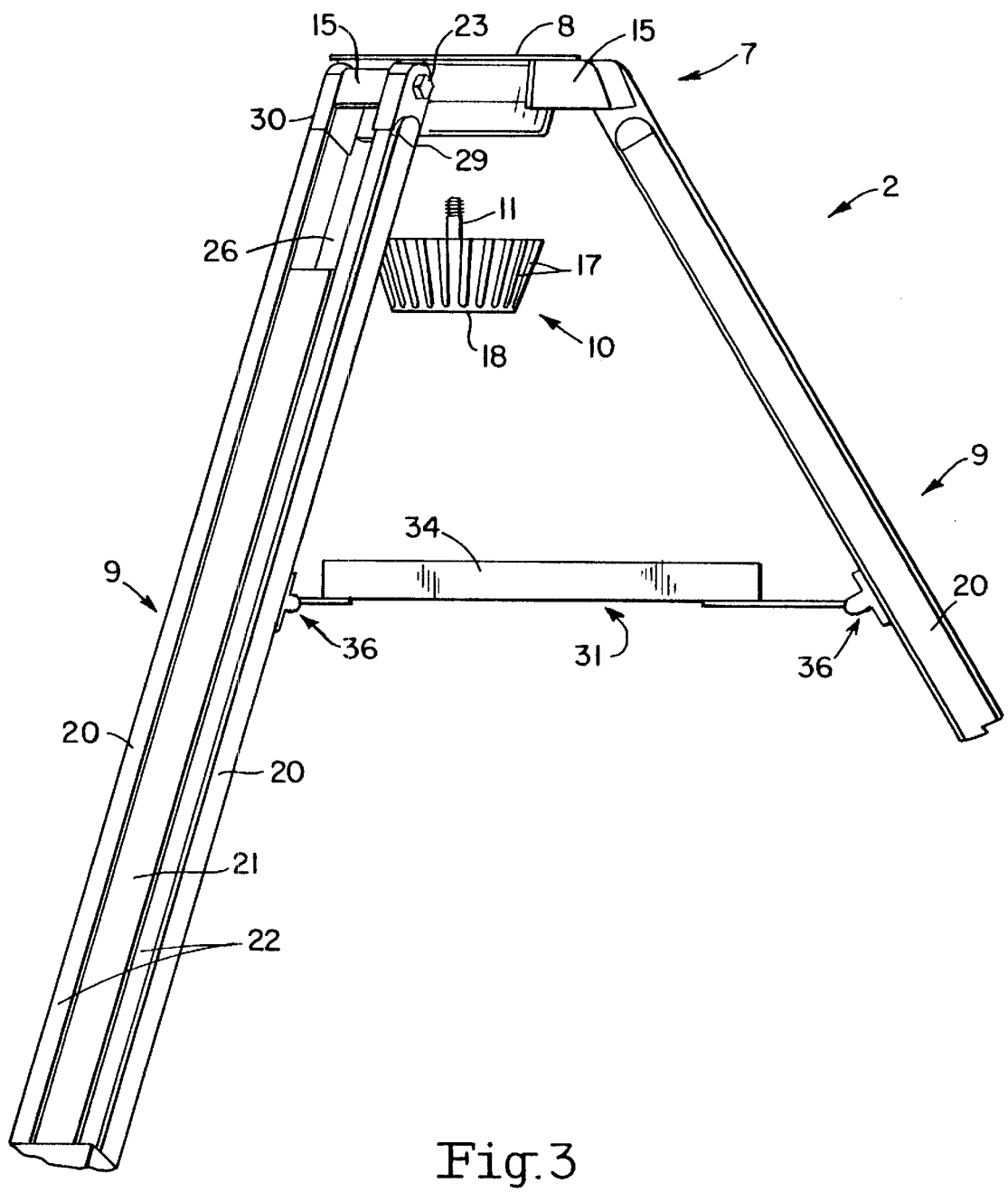
FIG. 3 is an exploded perspective view of the tripod used in the assembly illustrated in FIG. 1, showing the hand knob separated from the head of the tripod.

As shown in FIGS. 1, 2 and 4, telescope 3 includes a base 4, a fork 5 and an optical tube 6. Preferred telescopes for use in connection with the tripods of this invention include those manufactured by Celestron International under the designation Celestron®.

Tripod/telescope assembly 1 is put together simply by moving base 4 of telescope 3 through the central opening 8 of tripod head 7 into hand knob 10 and then screwing the threaded shaft 11 through a corresponding hole (not shown) formed on the underside of base 4. Removal of telescope 3 from tripod 2 involves unscrewing the threaded shaft 11 ad lifting the base 4 up out of the hand knob 10 and the central opening 8.

What is claimed is:

1. A tripod/telescope assembly, comprising:

(A) a telescope having a base having an upper support surface and a conical support extending downward about an axis, with a hole opening at a surface opposite said upper support surface and extending along said axis, a fork mounted on the upper support surface of said base, and an optical tube mounted on the fork;

(B) a tripod containing:
a tripod head having a central conical opening formed therein, said conical opening formed to accommodate said conical support of said base, and
three legs pivotally mounted on the tripod head; and (C) means for removably securing said base to said tripod head, said means having a hand knob and a member extending through the central conical opening with means for releasably engaging the hole opening in said base, said hand knob, member and means for releasably engaging the hole arranged such that rotating the hand knob in a first direction pulls the conical support in the direction of said axis into a secure engagement with the central conical opening.

2. An assembly according to claim 1, wherein the telescope comprises controls which are disposed within the fork.

3. An assembly according to claim 1, wherein said means for releasably engaging the base includes:
a threaded hole in said base extending in the direction of said axis, and a threaded structure on said extending member threadably engagable with said threaded hole.

4. An assembly according to claim 1, wherein the tripod further comprises a brace member which is attached to each of the legs so as to provide additional stability to the tripod.

5. A telescope support comprising:
a tripod head having a central conically shaped opening;
three legs pivotally mounted on the tripod head;
a base having a support surface and a conically shaped support extending, along an axis, under and away from said support surface, said conically shaped support engaged with and contacting said conically shaped opening;
means for securing a telescope to said support surface; and
means for removably securing said base to said tripod head, said means having a hand knob and a member extending through the central opening with means for releasably engaging the base, said hand knob and means for engaging the base arranged such that rotating the hand knob pulls the conical support in the direction of said axis into a secure engagement with the conical shaped opening.

6. A telescope support according to claim 5, wherein said means for releasably engaging the base includes:
a threaded hole in said base extending in the direction of said axis, and
a threaded structure on said extending member threadably engagable with said threaded hole.

7. A tripod according to claim 5, further comprising a brace member which is attached to each of the legs so as to provide additional stability to the tripod.

* * * * *